United States Patent [19]

Kumashiro

[11] Patent Number: 5,898,796
[45] Date of Patent: Apr. 27, 1999

[54] METHOD OF PROCESSING IMAGE HAVING VALUE OF ERROR DATA CONTROLLED BASED ON IMAGE CHARACTERISTIC IN REGION TO WHICH PIXEL BELONGS

[75] Inventor: Hideo Kumashiro, Toyokawa, Japan

[73] Assignee: Minolta Co., Ltd., Osaka, Japan

[21] Appl. No.: 08/784,319

[22] Filed: Jan. 16, 1997

Related U.S. Application Data

[63] Continuation of application No. 08/425,714, Apr. 20, 1995, abandoned, which is a continuation of application No. 08/090,789, Jul. 13, 1993, abandoned.

[30] Foreign Application Priority Data

Jul. 21, 1992  [JP]  Japan .................................. 4-194203
Jul. 21, 1992  [JP]  Japan .................................. 4-194204
Jul. 21, 1992  [JP]  Japan .................................. 4-194205

[51] Int. Cl.$^6$ .............................. G06K 9/36; G06K 9/38; G06K 9/46; G06K 9/66
[52] U.S. Cl. .......................... 382/252; 382/171; 382/195; 358/457; 358/429
[58] Field of Search .................................. 382/270, 271, 382/272, 273, 251, 252, 195; 358/445, 455, 456, 466, 457, 427, 429

[56] References Cited

U.S. PATENT DOCUMENTS

| | | | |
|---|---|---|---|
| 4,554,593 | 11/1985 | Fox et al. | 358/282 |
| 4,578,713 | 3/1986 | Tsao et al. | 358/283 |
| 4,920,501 | 4/1990 | Sullivan et al. | 364/518 |
| 5,034,990 | 7/1991 | Klees | 382/22 |
| 5,131,059 | 7/1992 | Kobayashi et al. | 382/270 |
| 5,138,672 | 8/1992 | Hirabayashi et al. | 382/54 |
| 5,150,429 | 9/1992 | Miller et al. | 382/50 |
| 5,201,013 | 4/1993 | Kumagai | 382/270 |
| 5,245,444 | 9/1993 | Hashimoto | 358/445 |
| 5,253,936 | 10/1993 | Ishida | 358/427 |

FOREIGN PATENT DOCUMENTS

63-214073  9/1988  Japan .............................. H04N 1/40

Primary Examiner—Bipin Shalwala
Attorney, Agent, or Firm—Sidley & Austin

[57] ABSTRACT

An input signal represented by values of many levels obtained by reading out an original image is applied to a pixel characteristic extracting unit for extraction of a characteristic of a pixel. Based on the extracted pixel characteristic, a gain calculating process is effected based on the pixel characteristic in a first gain calculating unit. An attribute flag showing an image characteristic extracted by the pixel characteristic extracting unit is added to the gain calculated error data which is stored. An area characteristic is determined in an area characteristic extracting unit based on the flag. Based on the determination result, error correction with high precision is carried out in a second gain calculating unit.

18 Claims, 9 Drawing Sheets

DECODER TRUTH TABLE

| a | b | c | x | y |
|---|---|---|---|---|
| 0 | 0 | 0 | 0 | 0 |
| 0 | 0 | 1 | 1 | 0 |
| 0 | 1 | 1 | 0 | 1 |
| 1 | 1 | 1 | 1 | 1 |

MULTIPLEXER
TRUTH TABLE

| $D_0$ | $D_1$ | Y |
|---|---|---|
| 0 | 0 | $X_1$ |
| 1 | 0 | $X_2$ |
| 0 | 1 | $X_3$ |
| 1 | 1 | $X_4$ |

| 0 | 1 | 3 | 1 | 0 |
|---|---|---|---|---|
| 1 | 3 | 5 | 3 | 1 |
| 3 | 5 | 7 |   |   |

COEFFICIENTS OF ATTRIBUTE FLAG
WEIGHTING DIGITAL FILTER

FIG.13

| 0 | 1/26 | 3/26 | 1/26 | 0 |
|---|---|---|---|---|
| 1/26 | 3/26 | 5/26 | 3/26 | 1/26 |
| 3/26 | 5/26 | ✗ | | |

FIG. 14A

ERROR FILTER FOR
PHOTOGRAPHY REGION

| 0 | 0 | 1/9 | 0 | 0 |
|---|---|---|---|---|
| 0 | 1/9 | 3/9 | 1/9 | |
| 0 | 3/9 | ✗ | | |

FIG. 14B

ERROR FILTER FOR CHARACTER/
PHOTOGRAPHY INTERMEDIATE REGION

| 0 | 0 | 0 | 0 | 0 |
|---|---|---|---|---|
| 0 | 0 | 1/2 | 0 | 0 |
| 0 | 1/2 | ✗ | | |

FIG. 14C

ERROR FILTER FOR
CHARACTER REGION

METHOD OF PROCESSING IMAGE HAVING VALUE OF ERROR DATA CONTROLLED BASED ON IMAGE CHARACTERISTIC IN REGION TO WHICH PIXEL BELONGS

CROSS REFERENCE TO RELATED APPLICATION

This is a continuation of U.S. patent application Ser. No. 08/425,714 filed Apr. 20, 1995, now abandoned, which is a continuation of U.S. patent application Ser. No. 08/090,789 filed Jul. 13, 1993, now abandoned.

BACKGROUND OF THE INVENTION

1. Field of the Invention

The present invention relates generally to a method of processing an image, and more particularly, to a method of processing an image using an error diffusion method.

2. Description of the Related Art

An error diffusion method is one of gradation representations when image data represented by values of multiple levels is provided to a printer for a binary value. This is an excellent method in which gradation and resolution are compatible with each other. However, a method of processing an image by extracting a characteristic of an original image and controlling an error diffusion parameter based on the characteristic to carry out processing of an image of high quality and with high accuracy is disclosed in Japanese Patent Layed-Open No. 63-214073.

In the above-described method of processing an image, a characteristic of a pixel of interest (edge, concentration and the like) is extracted, and based thereon an amount of error feedback (in the case of a character, the amount of error feedback is set to 0 for simple conversion to a binary value) is controlled. However, such control has a problem from the standpoint of precision. For example, take into consideration the case where, although a characteristic of a pixel of interest is determined to be a character region, a characteristic of a plurality of pixels in the vicinity of the pixel of interest is determined to be a photography region. In this case, in a conventional method of processing an image, the pixel of interest is converted to a binary value by using an error diffusion parameter as the character region. However, it is appropriate to consider that this is caused by generation of any noise on the pixel of interest. Such noise is not subjected to any appropriate process.

In the above-described conventional method of processing an image, an original image is read out to be A/D converted. After that, shading correction or the like for correcting sensitivity variation of a CCD sensor and lighting variation of a light source is carried out in a correcting circuit. A characteristic of a pixel of interest (edge, concentration and the like) is extracted in a characteristic extracting unit based on data after correction, and based thereon the amount of error feedback is controlled.

However, when data is provided to a printer or a CRT having low resolution of dot density by such a method of processing an image, the dot density is increased in high concentration data. Gradation in a shadow region is worse than a theoretical value because of dot overlapping and the like.

On the other hand, in order to prevent deterioration of the gradation, image data is corrected to extract a characteristic of a pixel based on the corrected data, which, in turn, results in characteristic determination with low precision.

In addition, in the above-described conventional method of processing an image, a characteristic of a pixel of interest (edge, concentration and the like) is extracted, and based thereon an amount of error feedback (in the case of a character, the amount of feedback is set to 0 for simple conversion to a binary value) is controlled. However, only such control is not sufficient from the standpoint of precision. Error data obtained by an error diffusion method includes a positive component and a negative component. Since calculation was carried out for the absolute amount of the error data in the above-described conventional method of processing an image, it was difficult to process a special original image in high quality in which a character is written on a photography intermediate region.

SUMMARY OF THE INVENTION

One object of the present invention is to provide a method of processing an image with high precision.

Another object of the present invention is to provide a method of processing an image in high quality.

Still another object of the present invention is to provide a method of processing an image in which control can be carried out based on a characteristic of an original image.

A further object of the present invention is to provide a method of processing an image which prevents deterioration of gradation.

In order to achieve the above-described objects, the method of processing an image according to the present invention includes processing an image in which predetermined image data represented by values of multiple levels is obtained by applying an error diffusion method to image data read out, including the steps of determining an image characteristic of a region to which a pixel of interest belongs, and changing a diffusion region in an error diffusion process which is applied in conversion to values of multiple levels of the data of the pixel of interest based on the determined image characteristic.

Since such a method of processing an image changes the diffusion region in the error diffusion process based on the determined image characteristic, it is possible to carry out image processing with high precision and high quality.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
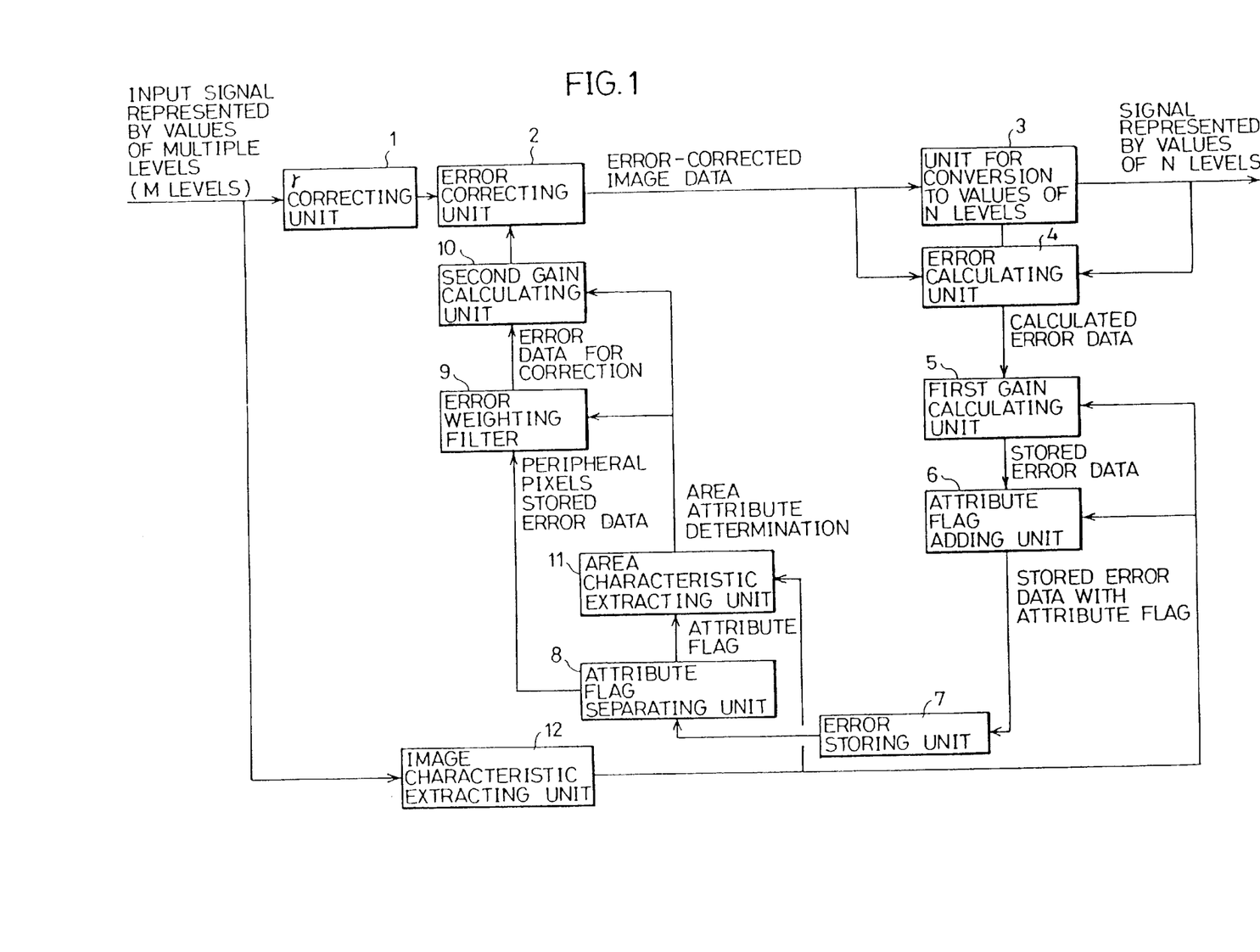
FIG. 1 is a block diagram showing an entire configuration of an apparatus for processing an image to which one embodiment of the present invention is applied.

FIG. 1 is a system block diagram showing a configuration of an image processing apparatus according to one embodiment of the present invention.

Description will now be given on a configuration and a function of each block with reference to the figure.

An image signal converted from an original image to data represented by values of multiple levels (values of M levels) by an image reader (IR) or the like has its non-linearity in gradation representation caused by dot overlapping or the like corrected in advance in a γ correcting unit 1. In providing data represented by values of N levels to a printer, a CRT or the like, striking dots in too high density causes the dots to overlap with each other, resulting in deterioration of area gradation. The correction is for preventing such deterioration.

Figure 2:
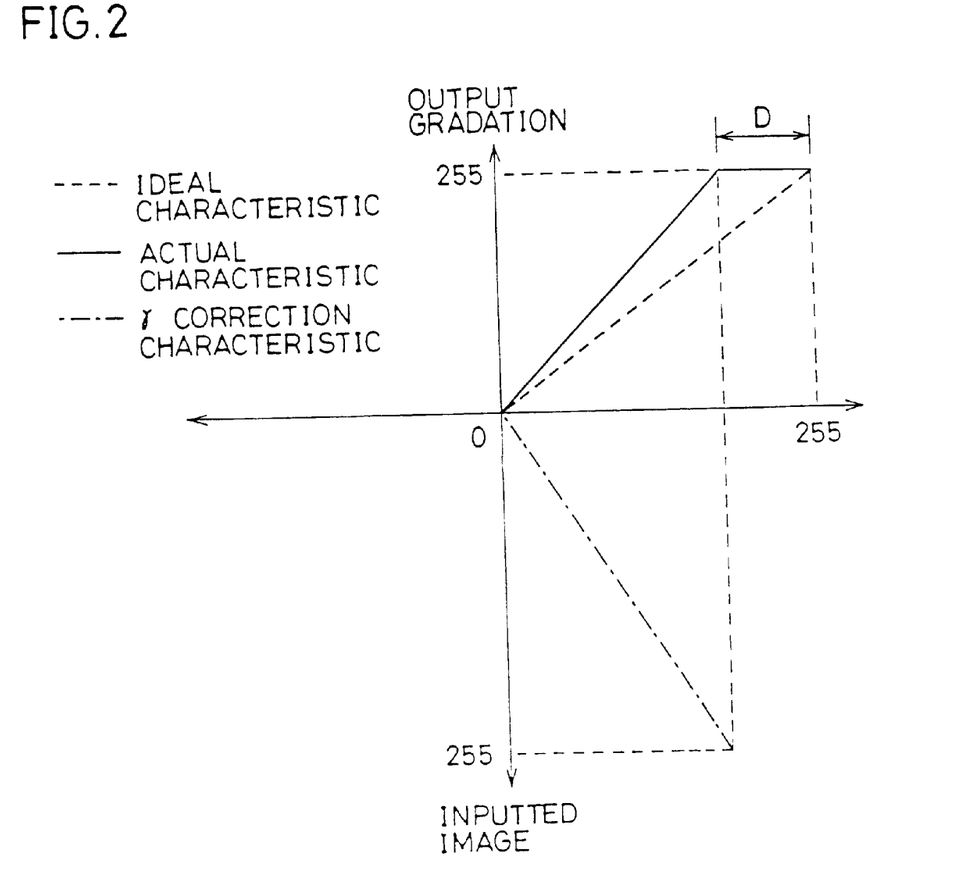
FIG. 2 is a graph showing a correction characteristic in a γ correcting unit 1 of FIG. 1.

FIG. 2 is a diagram showing a characteristic of a ROM table used in the γ correction.

In the figure, a broken line denotes an ideal characteristic, a solid line denotes a characteristic of data actually provided, and a broken line with dots denotes a characteristic of the γ correction. More specifically, even when density data of 256 gradations is obtained as an input image, the gradation characteristic cannot be reproduced. This is because, when dots are struck corresponding to the input data, the dots are close to each other in a portion of high density. Therefore, dynamic range conversion which does not use data of a portion shown by D in the figure (high density data region) is carried out. By carrying out such dynamic range conversion, 8-bit data of the obtained image data becomes substantially 7-bit data. Deterioration of data of approximately one bit cannot be avoided.

In FIG. 1, the output of the γ correcting unit 1 is deteriorated in precision as image data. Therefore, when the data is provided to a pixel characteristic extracting unit 12, it is not possible to extract a characteristic of a pixel with high precision. Therefore, in this embodiment, by directly applying image data (an input signal represented by values of multiple levels) to pixel characteristic extracting unit 12 before it is applied to γ correcting unit 1, it is possible to extract a characteristic of a pixel with high precision.

Data γ-corrected in the γ correcting unit 1 is applied to an error correcting unit 2. An error caused by conversion to values of N levels (M≧N) is corrected using an error diffusion method to be further converted to a signal represented by values of N levels in a unit 3 for conversion to values of N levels.

Description will now be given on a system of setting a threshold value used for conversion to values of N levels.

It is assumed that a recording system can indicate a multi-value level $D_i=i/(q-1)$, $(i=0, 1, 2, \ldots, q-1$: where q is the number of gradations). A pixel of interest Fm, n having an error corrected is compared to a threshold value $T_i=(D_i-D_0)/2$ for i. An output level Pm, n of multi-value is determined as follows.

$$Pm, n=D_i: Fm, n \geq T_i$$

$$Pm, n=D_{i-1}: T_{i-1} \leq Fm, n < T_i$$

Figure 3:
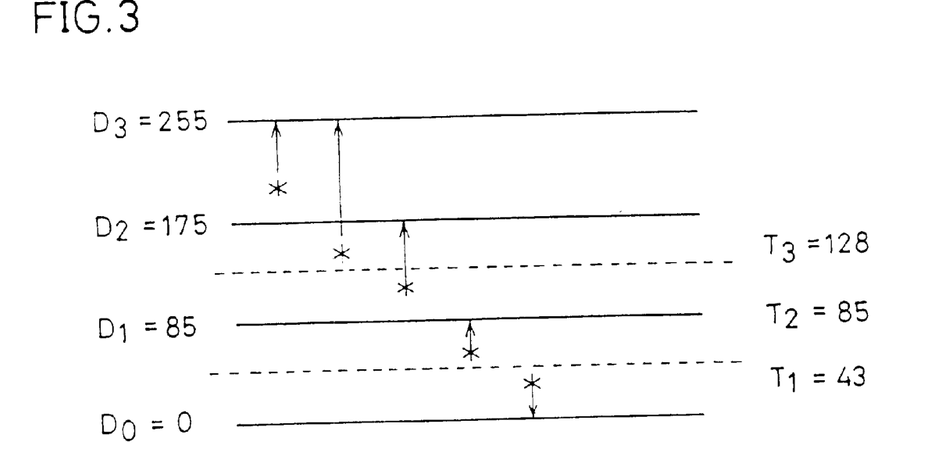
FIG. 3 is a diagram showing the contents of conversion to values of four levels shown as a specific example in a unit 3 for conversion to values of N levels of FIG. 1.

In the case of output for N=4, that is, output by values of four levels, a method of determining the output level of multi-value will be described with reference to FIG. 3.

When output values are $D_3=255$, $D_2=175$, $D_1=85$, and $D_0=0$, threshold values are $T_3=128$, $T_2=85$, and $T_1=43$ based on the above equations.

By setting the threshold values as described above, the range of an, input image value which the output level Pm, n of multi-value can assume is as follows.

$$Pm, n=255:128 \leq Fm, n \leq 255$$

$$Pm, n=175:85 \leq Fm, n < 128$$

$$Pm, n=85:43 \leq Fm, n < 85$$

$$Pm, n=0:0 \leq Fm, n < 43$$

Therefore, the range of absolute values of an error Em, n caused by conversion to values of N levels is as follows.

$$Pm, n=255:0 < |Em, n| \leq 128$$

$$Pm, n=175:0 < |Em, n| < 42$$

$$Pm, n=85:0 < |Em, n| < 42$$

$$Pm, n=0:0 < |Em, n| < 42$$

From the above equations, it is shown that a probability of occurrence of the error Em, n caused by conversion to values of N levels depends on the output values for image data in which all density data levels appear in average. As a result, an error for each pixel diffuses, whereby it is possible to suppress a quantized continuous tone which occurs when the input image value Fm, n is close to the output level Pm, n of multi-value for a medium tone image such as a photography image having an intense density change.

In the figure, solid lines correspond to output values $D_0$ to $D_3$, and broken lines correspond to threshold values $T_1$ to $T_3$. For example, when the input image value is between 255 and the threshold value $T_3$, that is, 128, the value of the output level Pm, n of multi-value is $D_3$, that is, 255.

Figure 4:
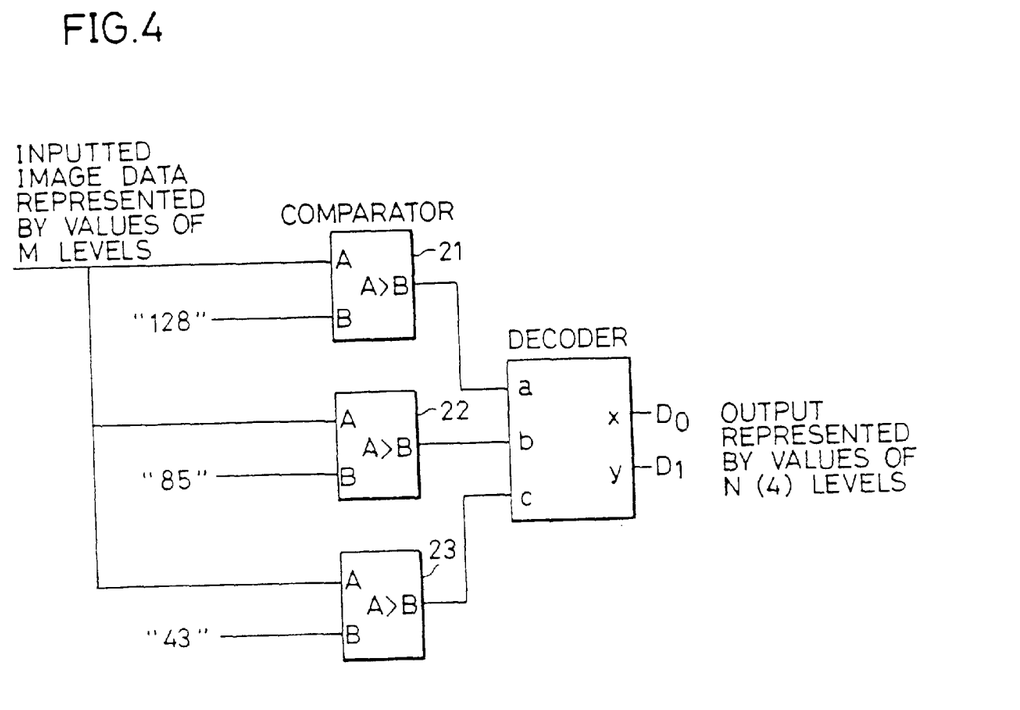
FIG. 4 is a diagram showing a specific configuration of unit 3 for conversion to values of N levels which corresponds to the specific example of FIG. 3.

FIG. 4 is a circuit diagram showing the specific contents of unit 3 for conversion to values of N levels in the case of values of N (four) levels.

The circuit is for converting 8-bit data represented by values of 256 levels to 2-bit data represented by values of four levels.

Figure 5:
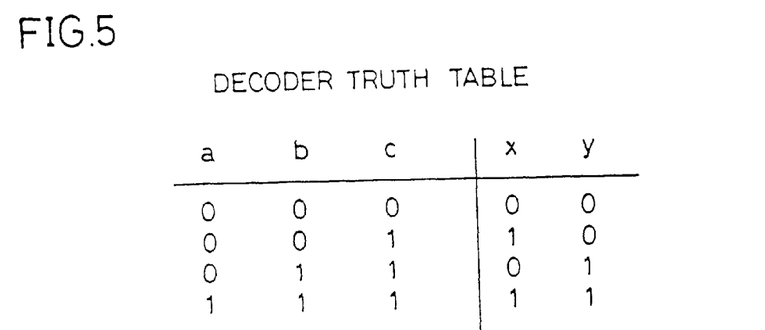
FIG. 5 is a decoder truth table of a decoder shown in FIG. 4.

In the figure, the input image data represented by values of M levels is applied to a terminal A of each of comparators 21, 22 and 23. Data "128" is applied to a terminal B of comparator 21. Data "85" is applied to a terminal B of comparator 22. Data "43" is applied to a terminal B of comparator 23. On the other hand, each output of comparators 21, 22 and 23 is applied to each of terminals a, b and c of a decoder 24. In the comparator, data applied to the terminal A is compared to data applied to the terminal B. When A>B, data "1" is provided to decoder 24. When A≦B, data "0" is provided to decoder 24. FIG. 5 shows a decoder truth table of decoder 24.

By using such a circuit configuration, the input image data of 256 gradations is provided as data of values of four levels.

Based on error-corrected image data provided from error correcting unit 2, and a signal represented by values of N levels provided from unit 3 for conversion to values of N levels, an error caused by conversion to values of N levels is calculated in an error calculating unit 4.

Figure 6:
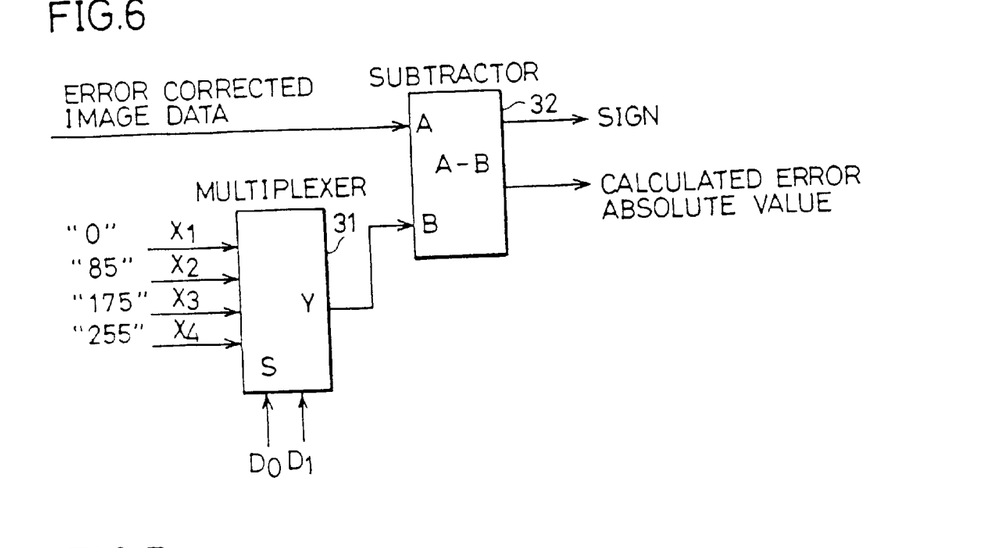
FIG. 6 is a diagram showing a configuration in a specific example of an error calculating unit 4 of FIG. 1.

FIG. 6 is a diagram showing a specific circuit configuration of the error calculating unit 4 when N=4, that is, when conversion to values of four levels is carried out.

More specifically, the circuit calculates:

error caused by conversion to values of N(4) levels=(Fm, n)−(Pm, n)

Figure 7:
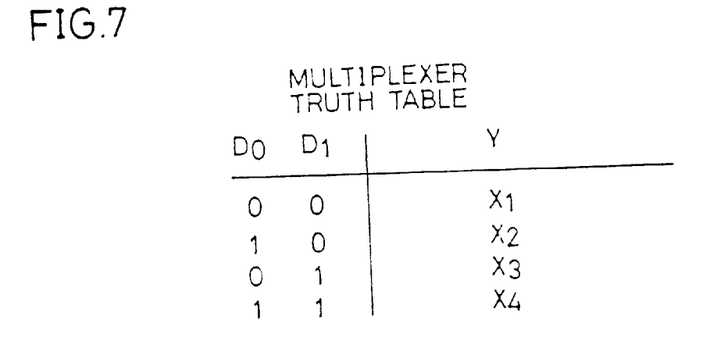
FIG. 7 is a multiplexer truth table of a multiplexer of FIG. 6.

In the figure, error-corrected image data Fm, n is applied to a terminal A of a subtractor 32. Data "0", "85", "175" and "255" are applied to a multiplexer 31. A terminal (X1 to X4) corresponding to applied data is selected based on a truth table of FIG. 7 depending on each bit of 2-bit data D0 and D1 shown in FIG. 4. Data corresponding to the selected terminal is applied to a terminal B of subtractor 32. In subtractor 32, the difference between data applied to the terminal A and data applied to the terminal B is calculated. Based on the result, subtractor 32 provides calculated error data of a sign showing positive/negative of a value of the difference and a calculated error absolute value showing an absolute value of the difference.

On the other hand, an input signal represented by values of multiple levels is applied to pixel characteristic extracting unit 12 before it is applied to γ correcting unit 1. A characteristic (character/photography, edge or the like) on the basis of a pixel is extracted. As for a method of extraction, a known technology may be used such as MAX–MIN detecting circuits, a linear differential filter or the like.

Figure 8:
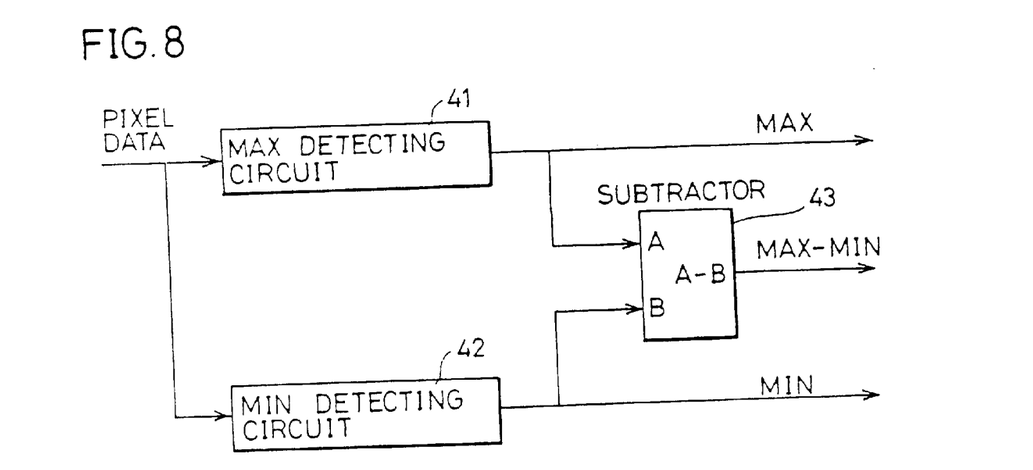
FIG. 8 is a diagram showing specific contents of a pixel characteristic extracting unit 12 of FIG. 1.
Figure 9A:
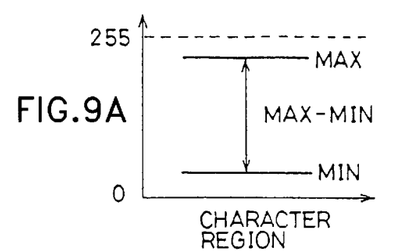
FIGS. 9A–9E are diagrams showing a characteristic of an image region for determining a characteristic of an original image based on outputs of FIG. 8.
Figure 9B:
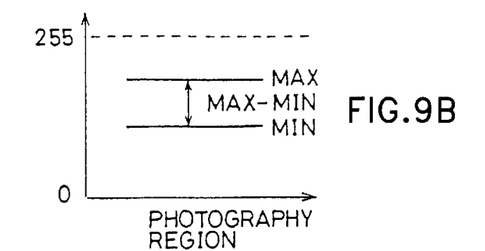
Figure 9C:
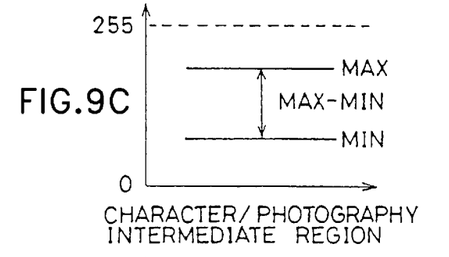
Figure 9D:
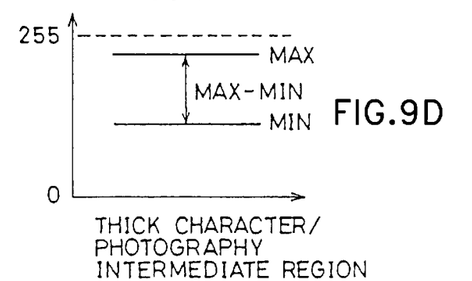
Figure 9E:
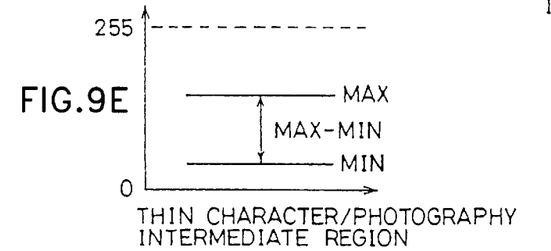

FIG. 8 is a diagram showing a specific configuration of the MAX–MIN detecting circuits.

In the figure, pixel data in a region in the vicinity of a pixel of interest is applied to a MAX detecting circuit 41 and a MIN detecting circuit 42. MAX detecting circuit 41 is a circuit for detecting the maximum pixel value MAX in the region in the vicinity of the pixel of interest. MIN detecting circuit 42 is a circuit for detecting the minimum pixel value MIN in the region in the vicinity of the pixel of interest. The pixel value MAX provided from MAX detecting circuit 41 is applied to a terminal A of subtractor 43. The pixel value MIN provided from MIN detecting circuit 42 is applied to a terminal B of subtractor 43. In subtractor 43, the difference between the pixel value applied to the terminal A and the pixel value applied to the terminal B is calculated, and a value of the difference (MAX–MIN) is provided.

FIGS. 9A–9E show characteristics of originals of basic kinds for determining a characteristic of an original image on the basis of pixel, based on each of the maximum pixel value MAX, the minimum pixel value MIN, and the difference value (MAX–MIN) calculated by the circuit of FIG. 8.

More specifically, based on the maximum pixel value MAX and the minimum pixel value MIN, originals of a character region (FIG. 9A), a photography region (FIG. 9B), a character/photography intermediate region (FIG. 9C), a thick character/photography intermediate region (FIG. 9D), and a thin character/photography intermediate region (FIG. 9E) are determined.

Error data calculated by error calculating unit 4 is subjected to a gain calculation process based on a rule corresponding to a characteristic of the pixel of interest in a first gain calculating unit 5, in response to the output of pixel characteristic extracting unit 12. As shown in FIG. 6, since a positive component and a negative component of the calculated error data are distinguishable at this time, it is possible to carry out control with high precision by calculating a gain for each of the positive component and the negative component. More specifically, this rule is as follows.

(1) If the pixel of interest is in the character region, it is preferred to attach importance to resolution. Therefore, neither the positive component nor the negative component of the calculated error data is fed back to the error diffusion process at all by setting gain to "0".

(2) If the pixel of interest is in the photography region, it is preferred to attach importance to gradation. Therefore, both the positive component and the negative component of the calculated error data are completely fed back to the error diffusion process by setting gain to "1".

(3) If the pixel of interest is in the character/photography intermediate region, it is preferred to keep balance between contrast and gradation. Therefore, only half the positive component and the negative component of the calculated error data are fed back to the error diffusion process by setting gain to "0.5".

(4) If the pixel of interest is in the thick character/photography intermediate region, it is preferred to attach importance to resolution in a high density portion and to attach importance to gradation in a low density portion. Therefore, only the positive component of the error data is fed back to the error diffusion process by setting positive component gain to "0.5" and negative component gain to "0".

(5) If the pixel of interest is in the thin character/photography intermediate region, it is preferred to attach importance to gradation in the high density portion and to attach importance to resolution in the low density portion. Therefore, only the negative component of the error data is fed back to the error diffusion process by setting positive component gain to "0" and negative component gain to "0.5".

As a result, it is possible to carry out an appropriate error diffusion process based on a characteristic of the original of the pixel of interest, making it possible to obtain an image of high quality and with high precision.

Then, an attribute flag indicating an image characteristic extracted by pixel characteristic extracting unit 12 is added to stored error data provided from first gain calculating unit 5. This is for carrying out error correction with high precision in the succeeding processes by making clear with the attribute flag what kind of original caused the error.

The stored error data itself is data of eight bits. By using one bit for a sign bit, the stored error data is processed as data of nine bits as shown by E in FIG. 10. However, even if precision itself of the image data originally corresponds to eight bits, precision of the data is deteriorated by one to two bits as described above because of shading correction or the other processes. Therefore, it is sufficient to have approximately seven bits including the sign bit for effective bits of the error data. Therefore, it is possible to assign the above-described attribute flag to a remaining one bit in a memory region of eight bits. The attribute flag is calculated by the following equations.

attribute flag=1:$Th \leq MAX-MIN$ (character image region)

attribute flag=0:$Th > MAX-MIN$ (photography image region)

(Th:threshold value)

Figure 10:
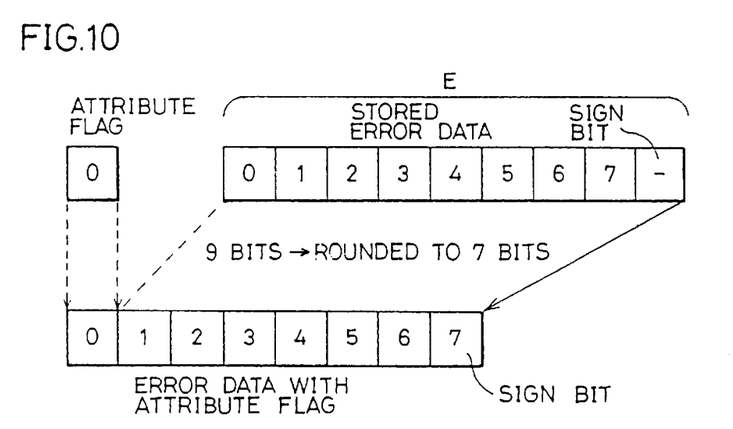
FIG. 10 is a diagram showing a method of generating error data with an attribute flag in an attribute flag adding unit of FIG. 1.

By defining the attribute flag as described above, the error data with the attribute flag in the example of FIG. 10 indicates data in the character image region, and the sign bit is stored in data of the last or eighth bit.

Figure 11:
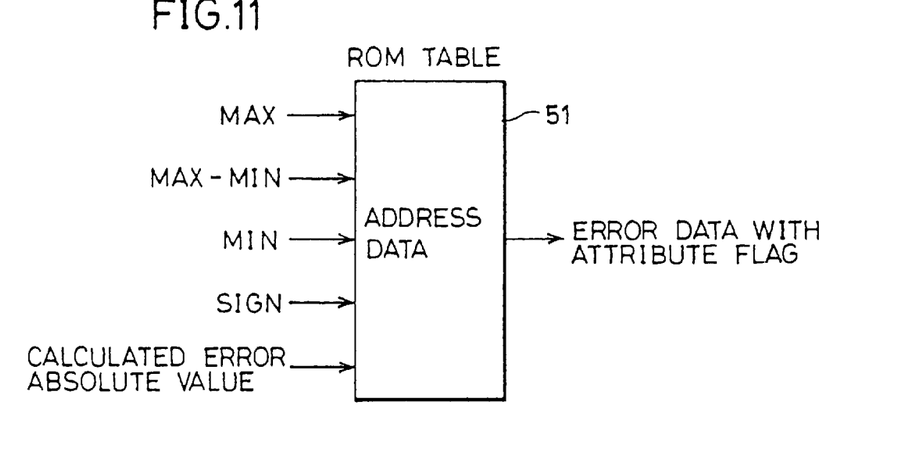
FIG. 11 is a diagram showing a specific configuration of attribute flag adding unit 6 of FIG. 1.

FIG. 11 is a diagram showing a specific example of a circuit combination of the first gain calculating unit 5 and an attribute flag adding unit 6.

As shown in the figure, with such calculation, conditions and outputs are in a one-to-one correspondence.

Therefore, by storing all combinations in a ROM table 51, it is possible to implement such calculation easily. The sign and the calculated error absolute value applied to ROM table 51 correspond to a portion shown by data E in the example of FIG. 10.

Several lines of the stored error data with an attribute flag provided from attribute flag adding unit 6 is held in an error storing unit 7 to be separated into the error data and the attribute flag by an attribute flag separating unit 8. The attribute flag separated by attribute flag separating unit 8 is applied to an area characteristic extracting unit 11. In area characteristic extracting unit 11, an area characteristic is extracted based on a characteristic by an attribute flag of a pixel of interest and a characteristic by an attribute flag of pixels in the vicinity of the pixel of interest.

Figure 12:
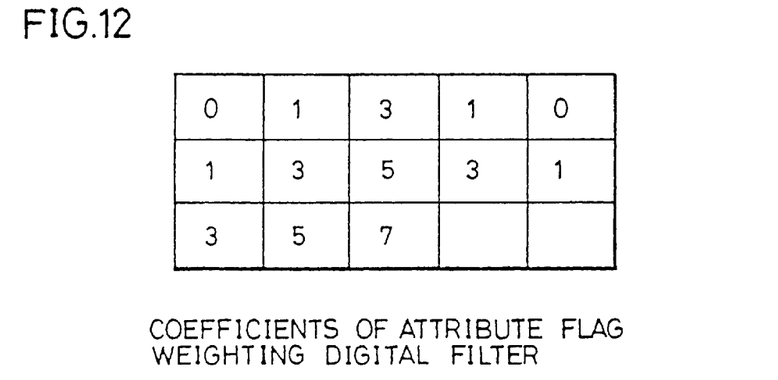
FIG. 12 is a diagram showing a specific example of coefficients of an attribute flag weighting digital filter used in an area characteristic extracting unit of FIG. 1.
Figure 13:
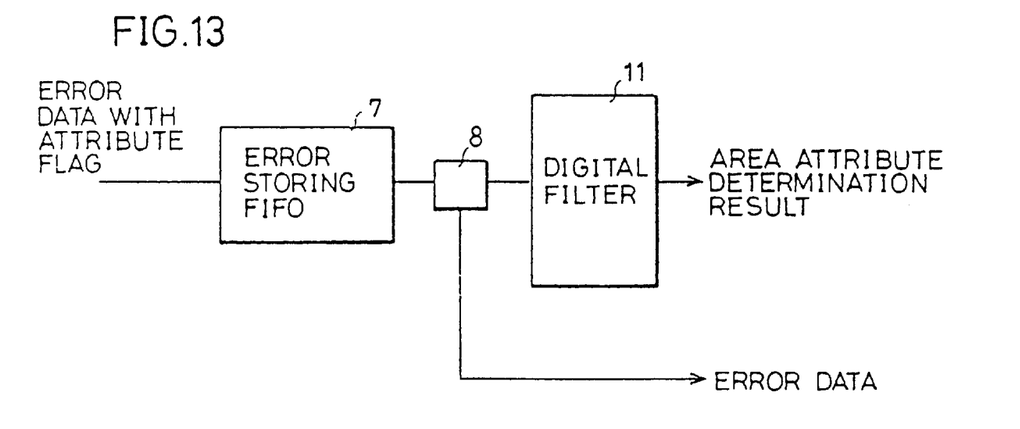
FIG. 13 is a diagram showing a specific configuration of an error storing unit 7, an attribute flag separating unit 8, and an area characteristic extracting unit 11 of FIG. 1.

Description will be given on the extracting operation with a specific example. As shown in FIG. 13, several lines of the error data with an attribute flag are held in a FIFO memory of error storing unit 7. The output is separated in attribute flag separating unit 8. Data of the attribute flag is applied to area characteristic extracting unit 11 of a digital filter. FIG. 12 shows specific contents of the digital filter. More specifically, a characteristic amount of attribute flags of the pixel of interest and pixels in the vicinity thereof are weighted by the attribute flag weighting digital filter. The result is provided in values of multiple levels (0 to 33) as an area attribute determination result. As is clear from FIG. 12, in order to suppress an erroneous determination of the area characteristic, a larger weight is applied to pixels closer to the pixel of interest (which corresponds to the pixel with a coefficient of "7") in weighting of the digital filter. Since a "1" of the attribute flag denotes the character image region, it is shown that as the area attribute determination result approaches 33, the original image is close to the character image region, and that, as the result approaches 0, the original image is close to the photography image region.

On the other hand, the error data separated in attribute flag separating unit 8 is subjected to weighting of the error data of peripheral pixels by the error weighting digital filter of a coefficient which corresponds to the attribute, based on the above-described area attribute determination result. The reference for selecting the digital filter is as follows.

$21 \leq$ area attribute determination result→digital filter coefficient= digital filter for character region $11 \leq$ area attribute determination result21→digital filter coefficient=digital filter for character/photography intermediate region $0 \leq$ area attribute determination result<11→digital filter coefficient=digital filter for photography region.

Figure 14A:
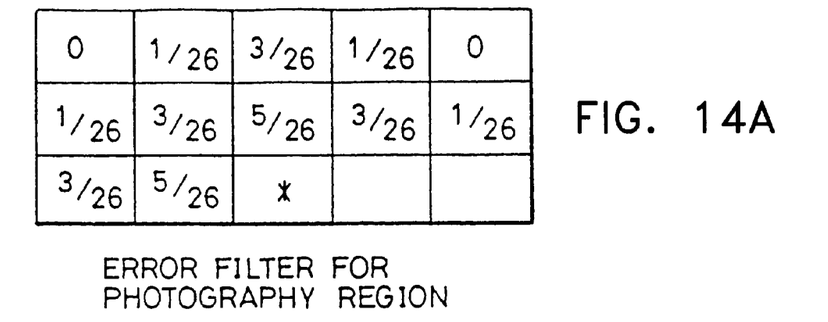
FIGS. 14A–14C are diagrams showing a specific example of an error filter corresponding to each region characteristic of an error weighting filter 9 of FIG. 1.
Figure 14B:
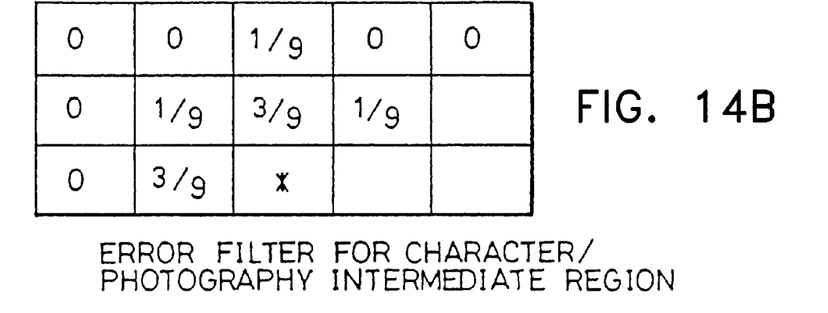
Figure 14C:
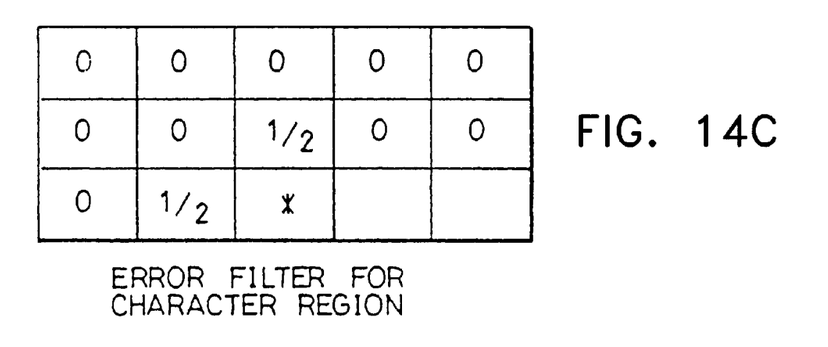

FIG. 14 shows a specific example of coefficients of the weighting digital filters.

In FIG. 14A, specific coefficients of the error filter for the photography region are shown. The symbol * shows a portion corresponding to the pixel of interest. In the photography region, the error data of peripheral pixels in a wide range is taken into consideration in order to attach importance to gradation.

FIG. 14B shows specific coefficients of the error filter for the character/photography intermediate region. In the character/photography intermediate region, in order to keep balance between gradation and resolution, the error data is taken into consideration of peripheral pixels in a range narrower than that of the error filter for the photography region.

FIG. 14C shows an example of specific coefficients of the error filter for the character region. In the character region, in order to attach importance to resolution, only the error data of peripheral pixels in a very small range is taken into consideration.

Figure 15:
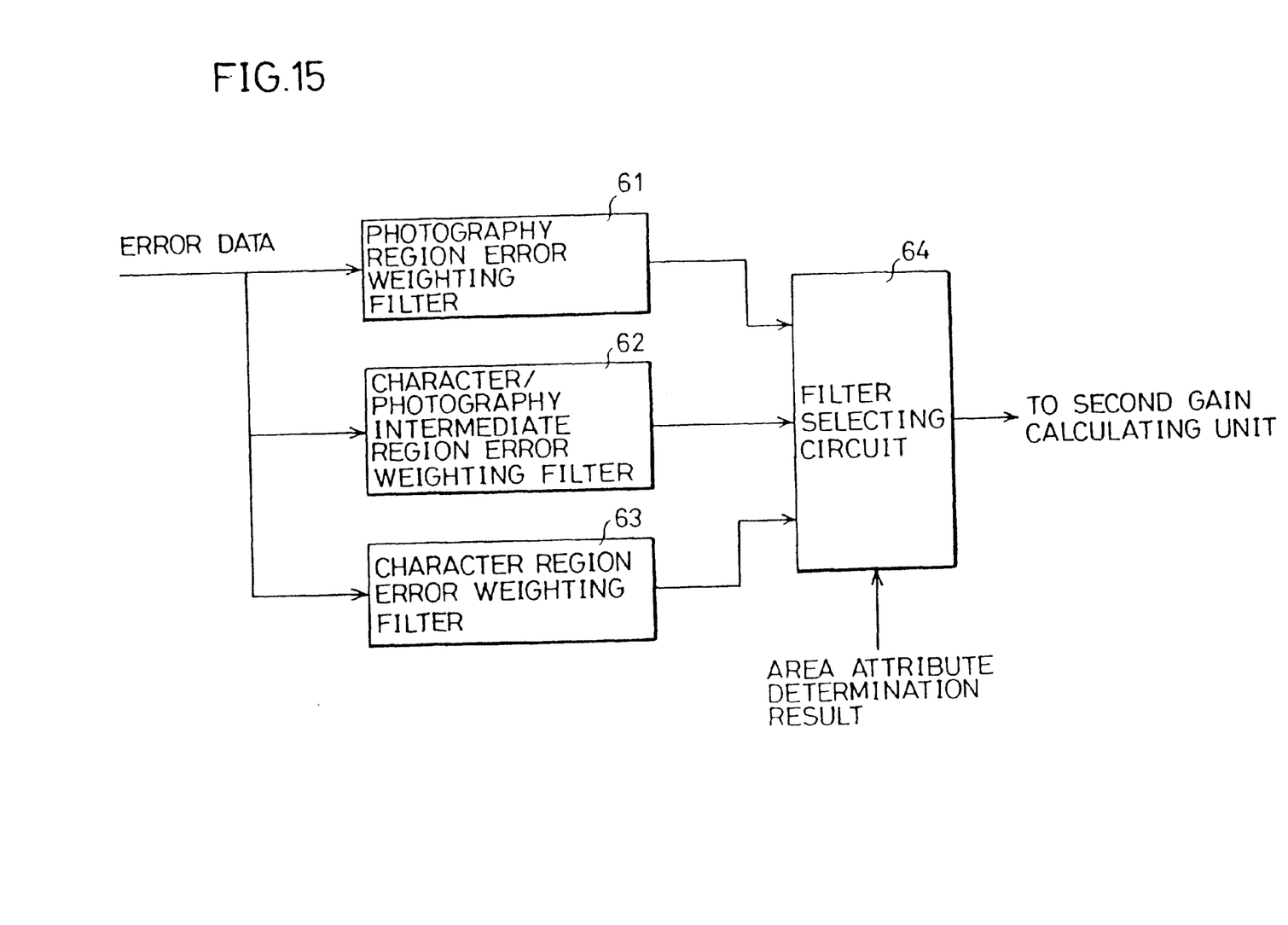
FIG. 15 is a diagram showing a specific configuration of an error weighting filter 9 of FIG. 1.

FIG. 15 is a block diagram showing a specific configuration of the error weighting filter 9.

In the figure, the error data provided from attribute flag separating unit 8 is applied to each of an error weighting filter 61 for a photography region, an error weighting filter 62 for a character/photography intermediate region, and an error weighting filter 63 for a character region to be filter-processed. After that, outputs of respective error weighting filters are applied to filter selecting circuit 64. The area attribute determination result provided from area characteristic extracting unit 11 is applied to filter selecting circuit 64. Filter selecting circuit 64 selects any of the outputs of the weighting filters based on the area attribute determination result to provide the contents to a second gain calculating unit 10.

The error data for correction calculated by error weighting filter 9 is subjected to gain calculation of the error based on the area attribute determination result by the output of area characteristic extracting unit 11 in second gain calculating unit 10. More specifically, if the pixel of interest is included in the character image region from the standpoint of area, the error data for correction is set to 0 for simple conversion to values of N levels, assuming that gain=0. On the other hand, the pixel of interest is included in the character/photography intermediate image region from the standpoint of area, the error diffusion process is carried out by using only half the error data for correction, assuming that gain=0.5. If the pixel of interest is included in the photography image region from the standpoint of area, the error diffusion process is carried out by using all the error data for correction, assuming that gain=1.

In brief summary, when the error data is stored, gain calculation is carried out based on a characteristic for every pixel of interest. On the other hand, gain calculation is carried out based on the area attribute determination result taking also into consideration characteristics of peripheral pixels, with respect to the error weighting filter output data which calculates the error data for correction of the pixel of interest by the error data of peripheral pixels. As a result, it is possible to carry out the error diffusion process based on region determination with few erroneous determination and with high precision.

Figure 16:
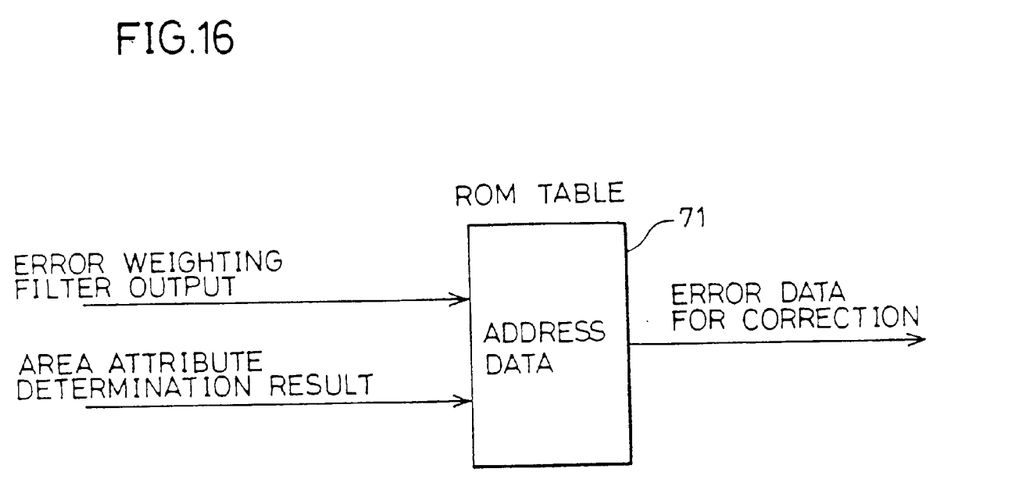
FIG. 16 is a diagram showing a specific configuration of a second gain calculating unit 10 of FIG. 1.

FIG. 16 is a diagram showing a specific configuration of the second gain calculating unit 10.

In the figure, the error weighting filter output and the area attribute determination result are applied to a ROM table 71. Then, the error data calculated based on the above gain is provided to error correcting unit 2.

Based on the error data provided from second gain calculating unit 10, correction of the error is carried out in error correcting unit 2.

In the above-described embodiment, extraction of an area characteristic is carried out based on an attribute flag. However, the area characteristic may be extracted by extracting a characteristic of one pixel to store the same in a FIFO memory. It is also possible to have a configuration in which a characteristic of one pixel and an area characteristic are extracted separately.

Although the attribute flag is data of one bit in the above embodiment, the attribute flag of data of several bits makes it possible to carry out control with higher precision.

Although the above embodiment is applied to the error diffusion method, the present invention can be applied to the image processing by any area gradation method such as a dither method.

Any of a multiplier, a ROM table, a decoder and a bit shift register may be used in the calculation process of first gain calculating unit 5 in the above embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of processing an image for sequentially reading density data represented by values of M levels (M≧N), of continuous pixels constituting an image and by applying an error diffusion process to the read density data so that the density data is converted to image data represented by values of N levels (M≧N), comprising the steps of:

(i) calculating an error caused by conversion of a pixel of interest to values of N levels;
   (ii) selecting a characteristic of the pixel of interest;
   (iii) storing the error calculated in step (i) and the characteristic of the pixel of interest selected in step (ii) corresponding to each other;
   (iv) extracting the characteristic of the next pixel of interest;
   (v) correcting said error based on the characteristic of the pixel of interest stored in step (iii) and the characteristic of the next pixel of interest extracted in step (iv); and
   (vi) carrying out conversion to values of N levels of said next pixel of interest using the error corrected in step (v).

2. A method of processing an image for sequentially reading density data represented by values of M levels (M≧N), of continuous pixels constituting an image and applying an area gradation process to the read density data so that the density data is converted to image data represented by values of N levels (M≧N), comprising the steps of:

(i) applying a correction for improving non-linearity of area gradation to the read density data;
   (ii) calculating an error caused by conversion of said density data to values of N levels;
   (iii) extracting a characteristic of a pixel based on the density data before being subjected to the correction of said step (i);
   (iv) correcting the error according to the extracted characteristic of the pixel; and
   (v) carrying out conversion to values of N levels using the corrected error.

3. The method of processing an image as recited in claim 2, wherein said area gradation process includes an error diffusion process.

4. A method of processing an image for sequentially reading density data represented by values of M levels (M≧N), of continuous pixels constituting an image and applying an error diffusion process to the read density data so that the density data is converted to image data represented by values of N levels (M≧N), comprising the steps of:

(i) calculating an error caused by conversion of a pixel of interest to values of N levels, the error being a difference between respective density levels of data before and after conversion to values of N levels;
   (ii) applying a prescribed processing to the calculated error, a content of the prescribed processing carried out when said error has a positive value being different from that of the prescribed processing carried out when said error has a negative value;
   (iii) correcting the error based on a result of said prescribed processing; and
   (iv) carrying out conversion to values of N levels using the corrected error.

5. Apparatus for processing an image for sequentially reading density data represented by values of M levels (M≧N) of continuous pixels constituting an image and applying an error diffusion process to the read density data so that the density data is converted to image data represented by values of N levels (M≧N), the apparatus comprising:

means for calculating an error caused by conversion of a pixel of interest to values of N levels;
   means for selecting a characteristic of the pixel of interest;
   means for storing the calculated error and the characteristic of the selected pixel of interest corresponding to each other;
   means for extracting a characteristic of the next pixel of interest;
   means for correcting said error based on the stored characteristic of the pixel of interest and the extracted characteristic of the next pixel of interest; and
   means for carrying out conversion to values of N levels of said next pixel of interest using said corrected error.

6. Apparatus for processing an image for sequentially reading density data represented by values of M levels (M≧N) of continuous pixels constituting an image and applying an area gradation process to the read density data so that the density data is converted to image data represented by values of N levels (M≧N), the apparatus comprising:

(i) means for applying a correction for improving non-linearity of area gradation to the read density data;
   (ii) means for calculating an error caused by conversion of said density data to values of N levels:
   (iii) means for extracting a characteristic of a pixel based on the density data before being subjected to correction;
   (iv) means for correcting the error according to the extracted characteristic of the pixel; and
   (v) means for carrying out conversion to values of N levels using the corrected error.

7. Apparatus for processing an image for sequentially reading density data represented by values of M levels (M≧N), of continuous pixels constituting an image and applying an error diffusion process to the read density data so that the density data is converted to image data represented by values of N levels (M≧N), the apparatus comprising:

(i) means for calculating an error caused by conversion of a pixel of interest to values of N levels, the error being a difference between respective density levels of data before and after conversion to values of N levels;

(ii) means for applying a prescribed processing to the calculated error, a content of the prescribed processing carried out when said error has a positive value being different from that of the prescribed processing carried out when said error has a negative value;

(iii) means for correcting the error based on a result of said prescribed processing; and (iv) means for carrying out conversion to values of N levels using the corrected error.

8. The method of processing an image as recited in claim 1, wherein in step (iv), said characteristic of the pixel of interest is extracted as any one of a character region, a photography region, a character/photography intermediate region, a thick character/photography intermediate region, and a thin character/photography intermediate region.

9. The method of processing an image as recited in claim 1, further comprising the step of correcting the read density data to improve nonlinearity of the area gradation process, wherein the selecting and extracting of the characteristics in steps (ii) and (iv) are effected based on the density data before the correction.

10. The method of processing an image as recited in claim 2, wherein the characteristic of the pixel extracted in said step (iii) includes a characteristic of a pixel of interest, a characteristic of pixels in a vicinity of the pixel of interest, and a characteristic of a region to which the pixel of interest belongs.

11. The method of processing an image as recited in claim 4, further comprising a step (v) of extracting a characteristic of a pixel, and wherein said step (ii) of applying a prescribed processing and said step (iii) of correcting the error are carried out according to the extracted characteristic of the pixel.

12. The method of processing an image as recited in claim 11, wherein the extracted characteristic of the pixel in step (v) includes a characteristic of a pixel of interest, a characteristic of pixels in a vicinity of the pixel of interest, and a characteristic of a region to which the pixel of interest belongs.

13. The apparatus as recited in claim 5, wherein the characteristic of the pixel of interest extracted by said extraction means is any one of a character region, a photography region, a character/photography intermediate region, a thick character/photography intermediate region, and a thin character/photography intermediate region.

14. The apparatus as recited in claim 5, wherein the error calculation means calculates a difference between respective density of levels of data before and after conversion to values of N levels, and said means for applying a prescribed processing uses a gain when the calculated error has a positive value which is different from the gain used when the calculated error has a negative value.

15. The apparatus as recited in claim 5, further comprising means for correcting the read density data to improve nonlinearity of the area gradation process, wherein said means for selecting the characteristic of the pixel of interest and said means for extracting the characteristic of the next pixel of interest is effected based on the density data before the correction.

16. The apparatus as recited in claim 6, wherein the characteristic of the pixel extracted by said characteristic extracting means includes a characteristic of a pixel of interest, a characteristic of pixels in a vicinity of the pixel of interest, and a characteristic of a region to which the pixel of interest belongs.

17. The apparatus as recited in claim 7, further comprising:

(v) means for extracting a characteristic of a pixel, and wherein said means for applying a prescribed processing and said means for correcting the error perform according to the extracted characteristic of the pixel.

18. The apparatus as recited in claim 17, wherein the extracted characteristic of the pixel includes a characteristic of a pixel of interest, a characteristic of pixels in a vicinity of the pixel of interest, and a characteristic of a region to which the pixel of interest belongs.

* * * * *